United States Patent
Klein et al.

(10) Patent No.: US 10,664,557 B2
(45) Date of Patent: May 26, 2020

(54) DIAL CONTROL FOR ADDITION AND REVERSAL OPERATIONS

(71) Applicant: Microsoft Technology Licensing, LLC, Redmond, WA (US)

(72) Inventors: Christian Klein, Duvall, WA (US); Gyancarlo Garcia Avila, Bellevue, WA (US); Callil R. Capuozzo, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 247 days.

(21) Appl. No.: 15/199,712

(22) Filed: Jun. 30, 2016

(65) Prior Publication Data

US 2018/0004720 A1    Jan. 4, 2018

(51) Int. Cl.
| | |
|---|---|
| *G06F 17/24* | (2006.01) |
| *G06F 9/451* | (2018.01) |
| *G06F 3/0488* | (2013.01) |
| *G06F 3/0362* | (2013.01) |
| *G06F 3/0484* | (2013.01) |
| *G06F 3/023* | (2006.01) |

(Continued)

(52) U.S. Cl.
CPC ............ *G06F 17/242* (2013.01); *G06F 3/023* (2013.01); *G06F 3/0362* (2013.01); *G06F 3/044* (2013.01); *G06F 3/0481* (2013.01); *G06F 3/04845* (2013.01); *G06F 3/04847* (2013.01); *G06F 3/04883* (2013.01); *G06F 3/04886* (2013.01); *G06F 9/451* (2018.02)

(58) Field of Classification Search
CPC ............... G06F 3/0362; G06F 3/04883; G06F 3/04886; G06F 3/04847; G06F 9/4443; G06F 3/02; G06F 3/04845; G01B 3/22
See application file for complete search history.

(56) References Cited

U.S. PATENT DOCUMENTS

| | | |
|---|---|---|
| 6,111,575 A | 8/2000 | Martinez et al. |
| 7,003,695 B2 | 2/2006 | Li |

(Continued)

FOREIGN PATENT DOCUMENTS

EP    3021205 A1    5/2016

OTHER PUBLICATIONS

Griffin Technology, PowerMate Bluetooth User Manual, <https://web.archive.org/web/20150114050919/http://griffintechnology.com/sites/default/files/MOD-37886-620-01-Tech%20Support_0.pdf> (Year: 2015).*
Chen, et al., "Data-driven Adaptive History for Image Editing", In Proceedings of the 20th ACM SIGGRAPH Symposium on Interactive 3D Graphics and Games, Feb. 27, 2016, pp. 103-111.

(Continued)

*Primary Examiner* — Kavita Padmanabhan
*Assistant Examiner* — Bille M Dahir
(74) *Attorney, Agent, or Firm* — International IP Law Group, PLLC (57) ABSTRACT

In one example, a method for modifying input with a dial includes creating a queue of input actions corresponding to one or more atomic operations for an application. The method can also include detecting a dial action from a dial, the dial action indicating a reversal operation for removing at least one input action from the queue of input actions or an addition operation for adding at least one input action to the queue of input actions. Furthermore, the method can include generating an intermediate representation of the one or more atomic operations based on the dial action from the dial.

22 Claims, 4 Drawing Sheets

(51) Int. Cl.
*G06F 3/044* (2006.01)
*G06F 3/0481* (2013.01)

(56) References Cited

U.S. PATENT DOCUMENTS

| | | | |
|---|---|---|---|
| 7,207,034 | B2 | 4/2007 | Burke et al. |
| 7,900,142 | B2 | 3/2011 | Baer |
| 8,392,377 | B2 | 3/2013 | Clark |
| 2004/0006763 | A1 | 1/2004 | Van De Vanter |
| 2005/0081105 | A1* | 4/2005 | Wedel .................. G06F 9/451 714/38.14 |
| 2006/0256090 | A1* | 11/2006 | Huppi .................. A63F 13/02 345/173 |
| 2010/0050188 | A1 | 2/2010 | Schellingerhout et al. |
| 2010/0138766 | A1 | 6/2010 | Nakajima |
| 2011/0107246 | A1 | 5/2011 | Vik |
| 2013/0120439 | A1* | 5/2013 | Harris .................. G11B 27/034 345/619 |
| 2013/0194217 | A1* | 8/2013 | Lee .................. G06F 3/041 345/173 |
| 2014/0040789 | A1 | 2/2014 | Munter et al. |
| 2015/0039566 | A1 | 2/2015 | Baumann et al. |
| 2015/0165323 | A1 | 6/2015 | Major et al. |
| 2015/0371422 | A1* | 12/2015 | Kokemohr .............. G06T 11/60 382/311 |
| 2016/0139741 | A1* | 5/2016 | Sakai .................. G06F 3/04817 715/841 |

OTHER PUBLICATIONS

Edwards, et al., "A Temporal Model for Multi-Level Undo and Redo", In Proceedings of the 13th annual ACM symposium on User interface software and technology, Nov. 1, 2000, pp. 31-40.

Berlage, Thomas, "A selective undo mechanism for graphical user interfaces based on command objects", In Journal of ACM Transactions on Computer-Human Interaction, vol. 1, No. 3, Sep. 1994, pp. 269-294.

"Android layout Animation when Scroll bar is scrolling up/down", Retrieved on: Jun. 13, 2016, Available at: http://stackoverflow.com/questions/30663850/android-layout-animation-when-scroll-bar-is-scrolling-up-down.

"Undo/Redo (fx.editablecontrol.js) Common Control Service", Published on: Mar. 12, 2015, Available at: https://msdn.microsoft.com/en-us/library/dn528505.aspx.

International Search Report and Written Opinion of the International Searching Authority, issued in PCT Application No. PCT/US2017/038891, dated Sep. 26, 2017, 16 pages.

Klemmer; "Tangible User interface Input: Tools and Techniques"; Feb. 2, 2004, 7 pages. retrieved from: URL:http://hci.stanford.edu/publications/2004/klemmer- dissertation/KlemmerDissertation.pdf.

Folmer, et al.; "Bridging Patterns: An Approach to Bridge Gaps Between SE and HCI"; Information and Software Technology, Elsevier, Amsterdam, NL, vol. 48, No. 2, Feb. 1, 2006, 21 pages.

Myers, et al.; "Reusale Hierarchical Command Objects"; Human Factors in Computing Systems, ACM, New York, NY, Apr. 13, 1996, 8 pages.

* cited by examiner

DIAL CONTROL FOR ADDITION AND REVERSAL OPERATIONS

BACKGROUND

Applications can accept many forms of input from touchscreen displays, keyboards, and mice, among others. In some examples, applications store a character stream of the most recent input characters and enable users to unwind the character stream. Therefore, in some examples, applications enable users to select an icon to manipulate the character stream by removing a previous input character or displaying a previously removed input character.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

An embodiment described herein includes a system for modifying input, wherein the system includes memory and at least one processor configured to create a queue of input actions corresponding to one or more atomic operations for an application. The at least one processor can also be configured to detect a dial action from a dial, wherein the dial action indicates a reversal operation for removing at least one input action from the queue of input actions or an addition operation for adding at least one input action to the queue of input actions. Furthermore, the at least one processor can be configured to generate an intermediate representation of the one or more atomic operations based on the dial action from the dial.

In another embodiment described herein, a method for modifying input can include creating a queue of input actions corresponding to one or more atomic operations for an application, wherein the input actions are provided by an input device. The method can also include detecting a dial action from a dial, wherein the dial action indicates a reversal operation for removing at least one input action from the queue of input actions or an addition operation for adding at least one input action to the queue of input actions. Furthermore, the method can include generating an intermediate representation of the one or more atomic operations based on the dial action from the dial.

In yet another embodiment described herein, one or more computer-readable storage devices for modifying input can include a plurality of instructions that, based at least on execution by a processor, cause the processor to create a queue of input actions corresponding to one or more atomic operations for an application. In some examples, the input actions are provided by an input device. The plurality of instructions can also cause the processor to detect a dial action from a dial, wherein the dial action indicates a reversal operation for removing at least one input action from the queue of input actions or an addition operation for adding at least one input action to the queue of input actions, and wherein the addition operation comprises repeating a last performed operation or increasing the intensity of the last performed operation. Furthermore, the plurality of instructions can cause the processor to generate an intermediate representation of the one or more atomic operations based on the dial action from the dial.

In another embodiment, a system for modifying input can include a dial to detect a dial action, an input device to provide an input action, and a processor to detect the input action from the input device. The processor can also store the input action in a queue of input actions corresponding to one or more atomic operations for an application and detect the dial action from the dial, wherein the dial action indicates a reversal operation for removing the input action from the queue of input actions or an addition operation for adding at least one input action to the queue of input actions. Furthermore, the processor can generate a modified input action based on the dial action and the queue of input actions, and provide the modified input action to the application.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Techniques described herein provide analog control of recent input actions. An input action, as referred to herein, can include any suitable keyboard selection, a selection from a touchscreen display, a selection from a mouse, and the like. For example, techniques described herein can capture points along a digital ink stroke in a graphics application and enable a user to reversal a mistake in the digital ink stroke by providing a dial action. A dial action, as referred to herein, can include turning a dial clockwise, counterclockwise, or any other suitable manipulation of the dial to select a recently performed operation or perform an input action based on a recently performed operation reversal. For example, an addition operation corresponding to an input action based on a recently performed operation and a reversal operation corresponding to a recently performed operation are described below to enable recent input actions to be selected or modified. A dial, as referred to herein, may be an analog dial coupled to the exterior of a system, a dial accessory connected wirelessly or via a wired connection to a system, or an analog user interface dial displayed on a touchscreen display, among others. In some embodiments, providing a dial action, such as turning the dial, can select an addition or reversal operation to increase or decrease the intensity of a recently performed operation, modify an intermediate state of a graphical interface tool, and the like. Accordingly, the techniques described herein provide a dial that enables the analog modification of recent and current input to an application or operating system.

In embodiments described herein, a system can create a queue of input actions corresponding to one or more atomic operations for an application or operating system. An atomic operation, as referred to herein, can include any operation that is indivisible or uninterruptible. For example, an atomic digital ink stroke operation may include capturing a single indivisible digital ink stroke detected by a touchscreen device or any other suitable input device. In some embodiments, a system can also detect a dial action from a dial, wherein the dial action indicates a reversal operation for removing at least one input action from the queue of input actions or an addition operation for adding at least one input action to the queue of input actions. For example, the reversal operation can include removing points from an atomic digital ink stroke to transform the atomic digital ink stroke into a divisible non-atomic operation.

In some embodiments, the system described herein can also generate or modify an intermediate representation of the one or more atomic operations based on the dial action from the dial. For example, the intermediate representation can pertain to any portion of an atomic digital ink stroke that has been detected as input. Accordingly, the dial can enable an atomic digital ink stroke to be reversed to an intermediate state. In some examples, the reversal operation and the addition operation can modify the intermediate states of various operations, as described in further detail below.

Figure 1:
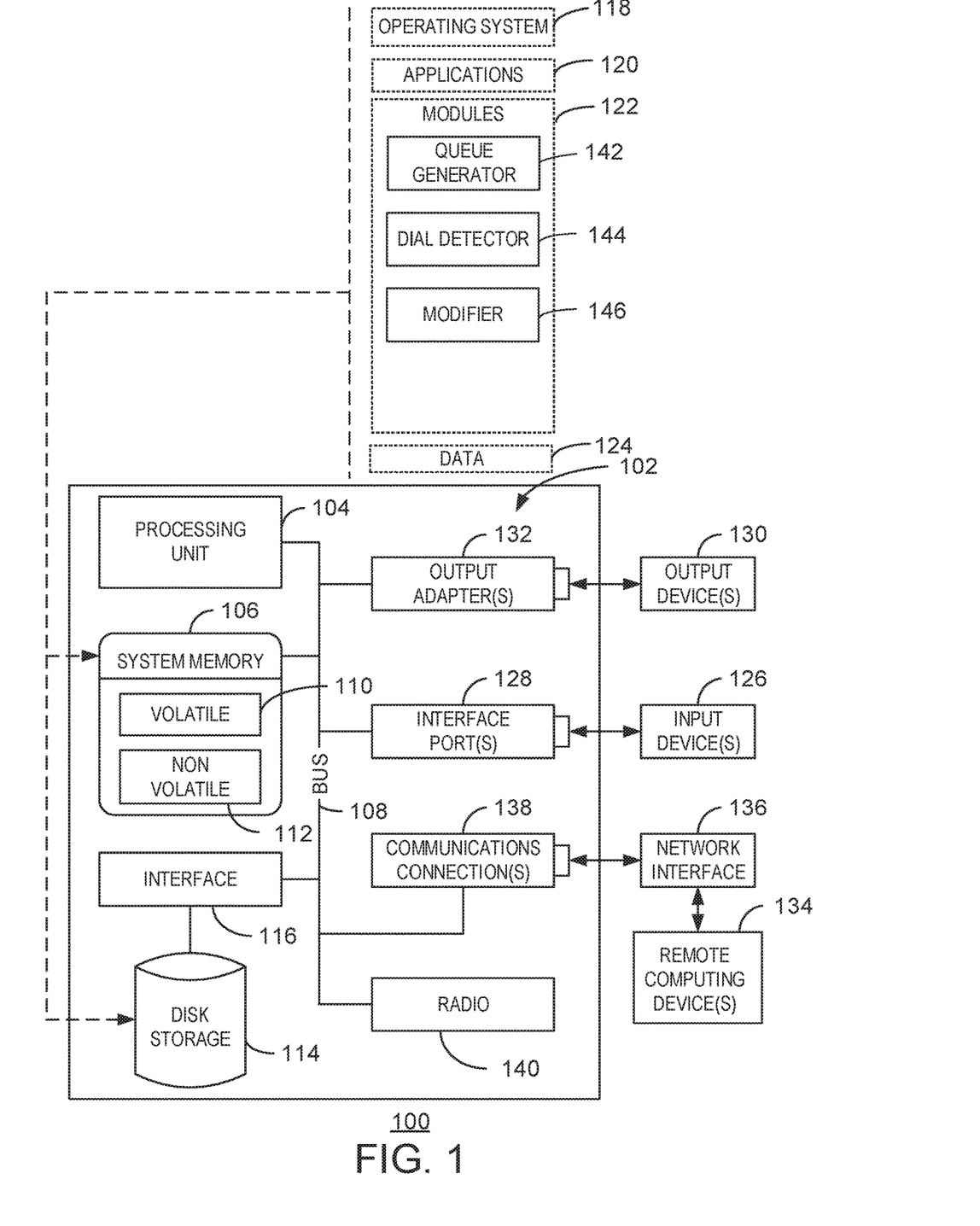
FIG. 1 is a block diagram of an example of a computing system that can detect an addition operation and a reversal operation corresponding to a dial action.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1 discussed below, provide details regarding different systems that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

FIG. 1 is a block diagram of an example of a computing system that can detect an addition operation and a reversal operation corresponding to a dial action. The example system 100 includes a computing device 102. The computing device 102 includes a processing unit 104, a system memory 106, and a system bus 108. In some examples, the computing device 102 can be a gaming console, a personal computer (PC), an accessory console, a gaming controller, among other computing devices. In some examples, the computing device 102 can be a node in a cloud network.

The system bus 108 couples system components including, but not limited to, the system memory 106 to the processing unit 104. The processing unit 104 can be any of various available processors. Dual microprocessors and other multiprocessor architectures also can be employed as the processing unit 104.

The system bus 108 can be any of several types of bus structure, including the memory bus or memory controller, a peripheral bus or external bus, and a local bus using any variety of available bus architectures known to those of ordinary skill in the art. The system memory 106 includes computer-readable storage media that includes volatile memory 110 and nonvolatile memory 112.

The basic input/output system (BIOS), containing the basic routines to transfer information between elements within the computer 102, such as during start-up, is stored in nonvolatile memory 112. By way of illustration, and not limitation, nonvolatile memory 112 can include read-only memory (ROM), programmable ROM (PROM), electrically programmable ROM (EPROM), electrically erasable programmable ROM (EEPROM), or flash memory.

Volatile memory 110 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 102 also includes other computer-readable media, such as removable/non-removable, volatile/non-volatile computer storage media. FIG. 1 shows, for example a disk storage 114. Disk storage 114 includes, but is not limited to, devices like a magnetic disk drive, floppy disk drive, tape drive. Jaz drive, Zip drive, LS-210 drive, flash memory card, or memory stick.

In addition, disk storage 114 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 114 to the system bus 108, a removable or non-removable interface is typically used such as interface 116.

It is to be appreciated that FIG. 1 describes software that acts as an intermediary between users and the basic computer resources described in the suitable operating environment 100. Such software includes an operating system 118. Operating system 118, which can be stored on disk storage 114, acts to control and allocate resources of the computer 102.

System applications 120 take advantage of the management of resources by operating system 118 through program modules 122 and program data 124 stored either in system memory 106 or on disk storage 114. It is to be appreciated that the disclosed subject matter can be implemented with various operating systems or combinations of operating systems.

A user enters commands or information into the computer 102 through input devices 126. Input devices 126 include, but are not limited to, a pointing device, such as, a mouse, trackball, stylus, and the like, a keyboard, a microphone, a joystick, a satellite dish, a scanner, a TV tuner card, a digital camera, a digital video camera, a web camera, any suitable dial accessory (physical or virtual), and the like. In some examples, an input device can include Natural User Interface (NUI) devices. NUI refers to any interface technology that enables a user to interact with a device in a "natural" manner, free from artificial constraints imposed by input devices such as mice, keyboards, remote controls, and the like. In some examples, NUI devices include devices relying on speech recognition, touch and stylus recognition, gesture recognition both on screen and adjacent to the screen, air gestures, head and eye tracking, voice and speech, vision, touch, gestures, and machine intelligence. For example, NUI devices can include touch sensitive displays, voice and speech recognition, intention and goal understanding, and motion gesture detection using depth cameras such as stereoscopic camera systems, infrared camera systems, RGB camera systems and combinations of these. NUI devices can also include motion gesture detection using accelerometers or gyroscopes, facial recognition, three-dimensional (3D) displays, head, eye, and gaze tracking, immersive augmented reality and virtual reality systems, all of which provide a more natural interface. NUI devices can also include technologies for sensing brain activity using electric field sensing electrodes. For example, a NUI device may use Electroencephalography (EEG) and related methods to detect electrical activity of the brain. The input devices 126 connect to the processing unit 104 through the system bus 108 via interface ports 128. Interface ports 128 include, for example, a serial port, a parallel port, a game port, and a universal serial bus (USB).

Output devices 130 use some of the same type of ports as input devices 126. Thus, for example, a USB port may be used to provide input to the computer 102 and to output information from computer 102 to an output device 130.

Output adapter 132 is provided to illustrate that there are some output devices 130 like monitors, speakers, and printers, among other output devices 130, which are accessible via adapters. The output adapters 132 include, by way of illustration and not limitation, video and sound cards that provide a means of connection between the output device 130 and the system bus 108. It can be noted that other devices and systems of devices provide both input and output capabilities such as remote computing devices 134.

The computer 102 can be a server hosting various software applications in a networked environment using logical connections to one or more remote computers, such as remote computing devices 134. The remote computing devices 134 may be client systems configured with web browsers, PC applications, mobile phone applications, and the like. The remote computing devices 134 can be a personal computer, a server, a router, a network PC, a workstation, a microprocessor based appliance, a mobile phone, a peer device or other common network node and the like, and typically includes many or all of the elements described relative to the computer 102.

Remote computing devices 134 can be logically connected to the computer 102 through a network interface 136 and then connected via a communication connection 138, which may be wireless. Network interface 136 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection 138 refers to the hardware/software employed to connect the network interface 136 to the bus 108. While communication connection 138 is shown for illustrative clarity inside computer 102, it can also be external to the computer 102. The hardware/software for connection to the network interface 136 may include, for exemplary purposes, internal and external technologies such as, mobile phone switches, modems including regular telephone grade modems, cable modems and DSL modems, ISDN adapters, and Ethernet cards.

The computer 102 can further include a radio 140. For example, the radio 140 can be a wireless local area network radio that may operate one or more wireless bands. For example, the radio 140 can operate on the industrial, scientific, and medical (ISM) radio band at 2.4 GHz or 5 GHz. In some examples, the radio 140 can operate on any suitable radio band at any radio frequency.

The computer 102 includes one or more modules 122, such as a queue generator 142, a dial detector 144, and a modifier 146. In some embodiments, the queue generator 142 can create a queue of input actions corresponding to one or more atomic operations for an application or operating system. In some embodiments, the dial detector 144 can detect a dial action from a dial, the dial action indicating a reversal operation for removing at least one input action from the queue of input actions or an addition operation for adding at least one input action to the queue of input actions. In some embodiments, the modifier 146 can generate or modify an intermediate representation of the one or more atomic operations based on the dial action from the dial. The actions performed by the queue generator 142, dial detector 144, and modifier 146 are described in greater detail below in relation to FIG. 3.

It is to be understood that the block diagram of FIG. 1 is not intended to indicate that the computing system 102 is to include all of the components shown in FIG. 1. Rather, the computing system 102 can include fewer or additional components not illustrated in FIG. 1 (e.g., additional applications, additional modules, additional memory devices, additional network interfaces, etc.). Furthermore, any of the functionalities of the queue generator 142, the dial detector 144, and the modifier 146 may be partially, or entirely, implemented in hardware and/or in the processor 104. For example, the functionality may be implemented with an application specific integrated circuit, in logic implemented in the processor 104, or in any other device.

Figure 2:
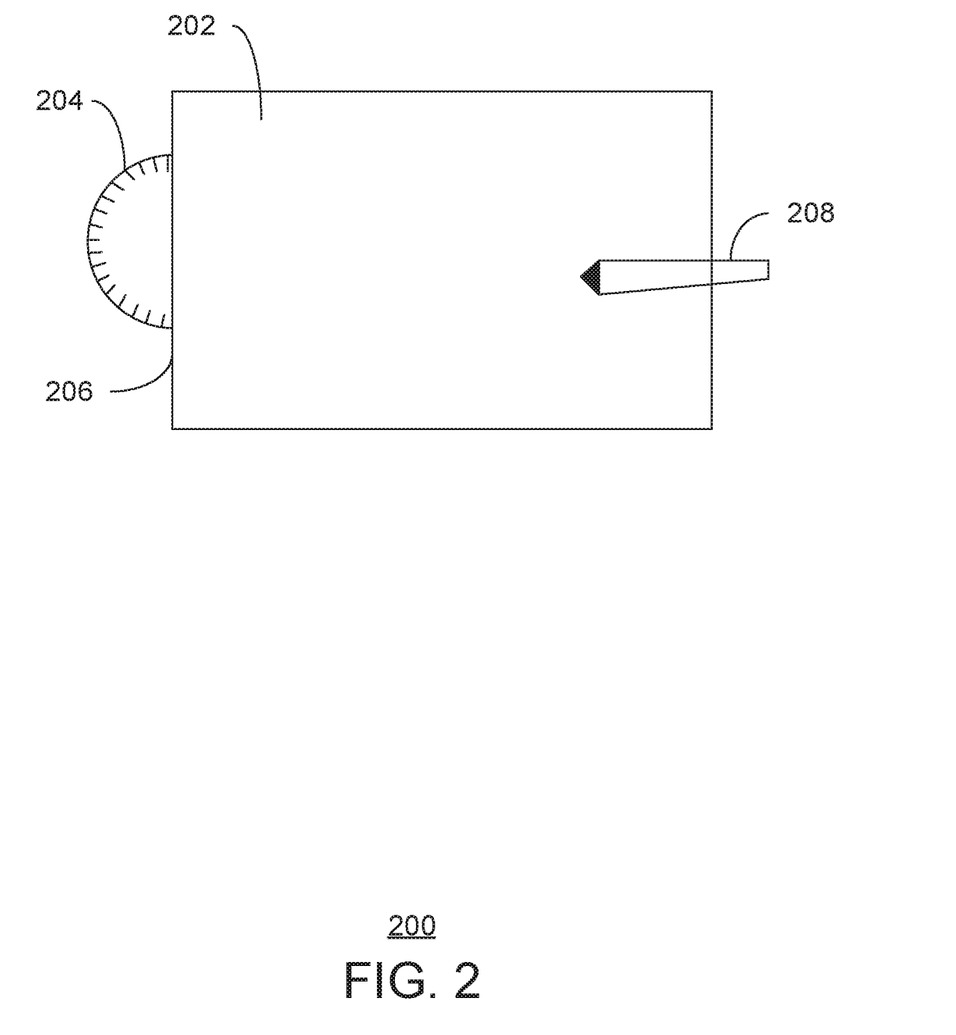
FIG. 2 is a diagram illustrating a dial used to detect an addition operation and a reversal operation.

FIG. 2 is a diagram illustrating a dial used to detect an addition operation and a reversal operation. The dial can be implemented by any suitable computing device, such as the computing system 102 of FIG. 1.

In some embodiments, the system 200 can include a device 202 with a dial 204 coupled to the exterior 206 of the device 202. In some examples, the dial 204 can also be a virtual dial displayed in a user interface for an application or operating system. In some embodiments, the dial 204 can also be a separate dial hardware component connected to the system 200 wirelessly or through a wired connection. In some embodiments, the dial 204 can initiate a reversal operation or an addition operation by turning, rotating, or otherwise modifying the dial. For example, turning the dial 204 clockwise can indicate an addition operation and turning the dial 204 counterclockwise can indicate a reversal operation. Alternatively, turning the dial 204 counterclockwise can indicate an addition operation and turning the dial 204 clockwise can indicate a reversal operation.

In some embodiments, the dial 204 can be turned at different speeds to indicate that the reversal or addition operations correspond to different speeds or different levels of granularity. For example, different speeds for turning the dial 204 can correspond to an addition or reversal operation for a character or a word. In some examples, there may not be an operation in the queue of input actions for an addition operation. Thus, turning the dial 204 can repeat or reapply the last executed operation. For example, continuing to execute addition operations with a dial 204 can create copies of an object or progressively repeat an operation such as moving, resizing, changing a property, and the like.

In some embodiments, the device 202 can detect input from a second input device 208 such as a stylus, mouse, touch input device, or any other suitable input device. In some examples, the dial 204 can indicate an addition operation or a reversal operation that modifies the input provided by the second input device 208. For example, the dial 204 can indicate a previously selected source state and the second input device 208 can provide an input action based on the previously selected source state. For example, the second input device 208 can provide an input action that corresponds to a previously selected source state such as a previously selected brightness of an image, and the like. In some embodiments, the dial 204 can indicate an intermediate state that corresponds to a modification of a previous source state. For example, the dial 204 can modify a brightness corresponding to the second input device 208 from a previous source state.

It is to be understood that the block diagram of FIG. 2 is not intended to indicate that the system 200 is to include all of the components shown in FIG. 2. Rather, system 200 can include fewer or additional frames and data values not illustrated in FIG. 2.

Figure 3:
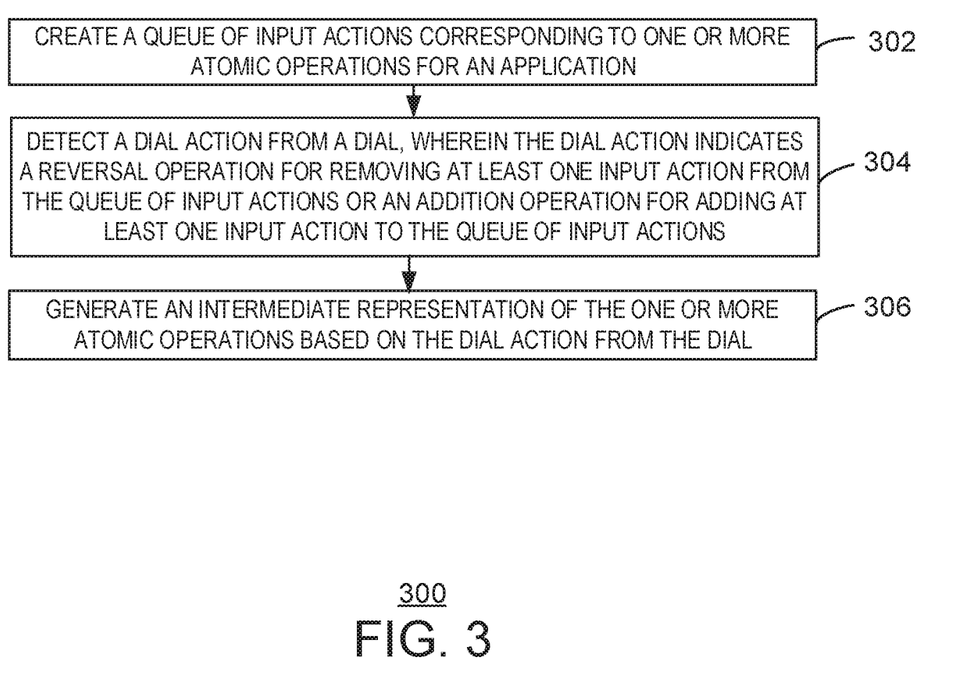
FIG. 3 is a process flow diagram of an example method for detecting an addition operation and a reversal operation corresponding to a dial action.

FIG. 3 is a process flow diagram illustrating a method for detecting an addition operation and a reversal operation corresponding to a dial action. The method 300 can be implemented with any suitable computing device, such as the computing system 102 of FIG. 1.

At block 302, a queue generator 142 can create a queue of input actions corresponding to one or more atomic operations for an application or operating system. As discussed above, an input action can include any suitable keyboard event or action, a selection from a touchscreen display, a selection from a mouse, and the like. In some examples, the queue generator 142 can store input actions corresponding to an atomic operation. An atomic operation, as discussed above, can include any operation that is indivisible or uninterruptible. For example, an atomic digital ink stroke operation may include capturing a single indivisible digital ink stroke detected by a touchscreen device or any other suitable input device. In some embodiments, the queue generator 142 can store the points along the atomic digital ink stroke in the queue of input actions. Additional atomic operations may correspond to a state of a graphical interface tool. For example, atomic operations corresponding to a state of a digital brush stroke can include modifying a brush width, a color, or any suitable effect for a brush. Each previously selected state of the digital brush stroke can be stored as an input action. In some embodiments, the atomic operation can also include changing the contrast or brightness of an image, changing a property of a document, such as the document's contents, brightness, or size, or any suitable operating system command such as copying files and changing a display brightness setting, among others.

At block 304, a dial detector 144 can detect a dial action from a dial, wherein the dial action indicates a reversal operation for removing at least one input action from the queue of input actions or an addition operation for adding at least one input action to the queue of input actions. In some embodiments, the queue of input actions stores each of the previous input actions detected by a system. For example, each input action detected by an application or an operating system can be stored in the queue of input actions. In some examples, the addition operation can add a newly detected input action to the queue of input actions. Similarly, a reversal operation can remove an input action from the queue of input actions to provide a previously detected input action to an application or an operating system. In some embodiments, the reversal operation can include scanning the queue of input actions for a previously detected input action without removing any input actions from the queue. For example, the reversal operation can return a previously detected input action to an application or an operating system while maintaining each of the detected input actions in the queue. In some embodiments, the dial is an analog dial coupled to the exterior of the system. In other embodiments, the dial is a user interface dial displayed by the system. In some examples, the dial action comprises a clockwise movement indicating the reversal operation or the dial action comprises a counterclockwise movement indicating the addition operation.

In some embodiments, the queue of input actions corresponds to a series of points along an atomic digital ink stroke operation, and the dial action modifies the atomic digital ink stroke operation using the reversal operation. For example, the reversal operation can remove at least one of the points along the atomic digital ink stroke. In some embodiments, the queue of input actions corresponds to an atomic character operation, and the dial action generates an intermediate representation of the atomic character operation. For example, the dial action can include using the reversal operation to remove at least one character from the queue of input actions. In some examples, the dial action can include using the addition operation to add previously removed characters to the queue of input actions. In some embodiments, the queue of input actions corresponds to states of graphical interface tools, and the dial action modifies the intermediate representation of one of the states of the graphical tools as discussed below in reference to block 306.

At block 306, a modifier 146 can generate an intermediate representation of the one or more atomic operations based on the dial action from the dial. In some embodiments, the intermediate representation of an atomic instruction can include a common property or attribute of a current input action or a previous input action. For example, the dial action can indicate an addition operation that includes repeating a last performed operation or increasing the intensity of the last performed operation. In some embodiments, the addition operation comprises copying an object from the last performed operation. In some embodiments, the dial action indicates a reversal operation that includes modifying the effect of an image filter to maintain a reduced intensity version of the image filter. For example, the reversal operation can include modifying a current state of an image to reflect a hue, brightness, or additional setting from a previous source state. In some embodiments, the setting from the previous source state is modified by the dial action to generate the intermediate representation. For example, the dial action can detect a previous source state is associated with a brightness level and the dial action can modify the brightness level of the previous state. In some embodiments, the queue of input actions correspond to accessed files and the dial action corresponds to an addition operation that copies a last accessed file. In some embodiments, the dial can retroactively modulate settings such as a system volume, display brightness, moving an object on the screen, adding or removing items from a list, scrolling, panning, or zooming a current view, and the like.

In some embodiments, the modifier 146 can generate an intermediate representation based on a dial action that affects more advanced tools related to the history of operations in the shell or an application or operating system. For example, the dial can change the state of tools that function similar to a "history brush" by referencing a particular source state in a historical sequence of operations. In some examples, the dial can change the behavior of the active tool without interrupting a user's current application of the tool. For example, turning the dial can change a source state of the history brush while touch or pen input simultaneously applies the history brush based on the currently specified analog location in a history list. In some embodiments, since the dial provides analog input, the system may also interpolate a virtual source state or intermediate representation in the history that lies in between two actual states of the history, providing the user additional control of the intermediate state or representation.

In some embodiments, the dial action can include using the reversal operation to change a behavior of a current graphical interface tool to include at least one property from a previous input action. For example, the queue of input actions can be populated based on operations performed on an image, which generates one or more history states. In some examples, an input action can include changing the brightness of an image to make the image darker, among others. In some embodiments, the dial action can be used to specify one of the input actions corresponding to a history state as the source for a history brush tool. For example, the dial action can correspond to a reversal operation to an earlier history state before an image was darkened. An input device can then be used to apply the history brush tool itself to a part of the image. For example, if the input device provides a digital ink stroke on one side of an image with a pen, the system can reveal lighter image data that had been at that location at the specified history state. Accordingly, the dial action can use a reversal operation to enable an input device to change portions of an image to a previous state. In some embodiments, the dial action can be used with history-based tools regarding other domains, such as music editing, video editing, and text formatting, etc.

In one embodiment, the process flow diagram of FIG. 3 is intended to indicate that the steps of the method 300 are to be executed in a particular order. Alternatively, in other embodiments, the steps of the method 300 can be executed in any suitable order and any suitable number of the steps of the method 300 can be included. Further, any number of additional steps may be included within the method 300, depending on the specific application. For example, a system may also detect an input action from the input device, store the input action in a queue of input actions corresponding to one or more atomic operations for an application or operating system, and detect a dial action from the dial. Furthermore, the system may generate a modified input action based on the dial action and the queue of input actions, and provide the modified input action to the application or operating system. In some embodiments, the dial is a separate hardware component that transmits the dial action to the system using a wireless protocol or using a wired connection.

Figure 4:
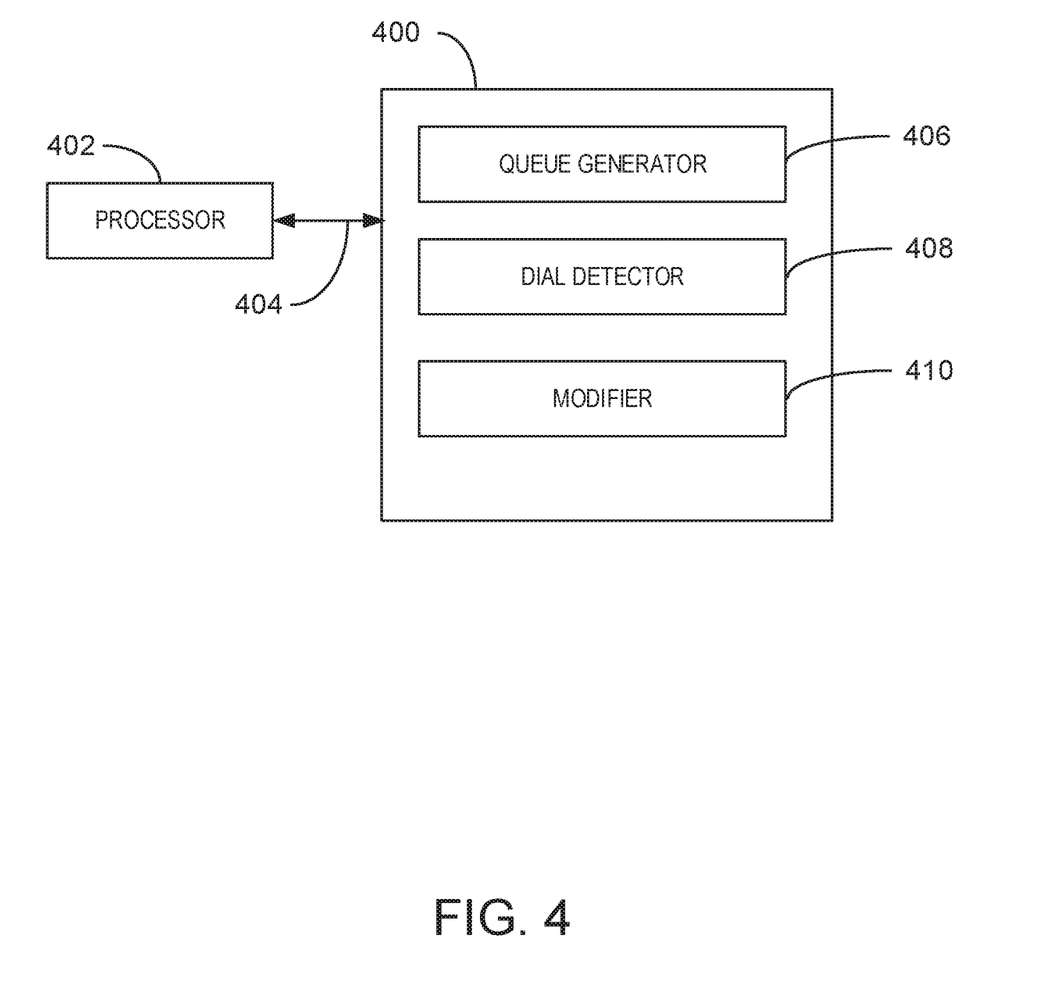
FIG. 4 is a block diagram of an example computer-readable storage media that can detect an addition operation and a reversal operation corresponding to a dial action.

FIG. 4 is a block diagram of an example computer-readable storage media that can detect an addition operation and a reversal operation corresponding to a dial action. The tangible, computer-readable storage media 400 may be accessed by a processor 402 over a computer bus 404. Furthermore, the tangible, computer-readable storage media 400 may include code to direct the processor 402 to perform the steps of the current method.

The various software components discussed herein may be stored on the tangible, computer-readable storage media 400, as indicated in FIG. 4. For example, the tangible computer-readable storage media 400 can include a queue generator 406, a dial detector 408, and a modifier 410. In some embodiments, the queue generator 406 can create a queue of input actions corresponding to one or more atomic operations for an application or operating system. In some embodiments, the dial detector 408 can detect a dial action from a dial, the dial action indicating a reversal operation for removing at least one input action from the queue of input actions or an addition operation for adding at least one input action to the queue of input actions. In some embodiments, the modifier 410 can generate or modify an intermediate representation of the one or more atomic operations based on the dial action from the dial.

It is to be understood that any number of additional software components not shown in FIG. 4 may be included within the tangible, computer-readable storage media 400, depending on the specific application.

Example 1

In one example, a system for modifying input includes memory and at least one processor configured to create a queue of input actions corresponding to one or more atomic operations for an application. The at least one processor can also be configured to detect a dial action from a dial, wherein the dial action indicates a reversal operation for removing at least one input action from the queue of input actions or an addition operation for adding at least one input action to the queue of input actions. Furthermore, the at least one processor can be configured to generate an intermediate representation of the one or more atomic operations based on the dial action from the dial.

In some embodiments, the dial is an analog dial coupled to the exterior of the system or the dial is a separate hardware component that transmits the dial action to the system using a wireless protocol or using a wired connection. Alternatively, or in addition, the dial can be an analog user interface dial displayed by the system. Alternatively, or in addition, the queue of input actions can correspond to a series of points along an atomic digital ink stroke operation, and the dial action can modify the atomic digital ink stroke operation using the reversal operation comprising removing at least one of the points along the atomic digital ink stroke. Alternatively, or in addition, the queue of input actions can correspond to an atomic character operation, and the dial action can generate the intermediate representation of the atomic character operation using the reversal operation comprising removing at least one character. Alternatively, or in addition, the queue of input actions can correspond to an atomic character operation, and the dial action can generate the intermediate representation of the atomic character operation using the addition operation comprising adding previously removed characters to the queue of input actions. Alternatively, or in addition, the dial action can generate an intermediate representation of a previously selected input action from the queue of input actions, wherein the reversal operation changes a state of a current graphical interface tool to include at least one property from the previously selected input action. Alternatively, or in addition, the dial action comprises a counterclockwise movement indicating the reversal operation or the dial action comprises a clockwise movement indicating the addition operation. Alternatively, or in addition, the addition operation comprises repeating a last performed operation or increasing the intensity of the last performed operation. Alternatively, or in addition, the addition operation comprises copying an object from the last performed operation. Alternatively, or in addition, the reversal operation comprises modifying the effect of an image filter to maintain a reduced intensity version of the image filter. Alternatively, or in addition, the queue of input actions correspond to accessed files and the addition operation comprises copying a last accessed file.

Example 2

In another embodiment described herein, a method for modifying input can include creating a queue of input actions corresponding to one or more atomic operations for an application, wherein the input actions are provided by an input device. The method can also include detecting a dial action from a dial, wherein the dial action indicates a reversal operation for removing at least one input action from the queue of input actions or an addition operation for adding at least one input action to the queue of input actions. Furthermore, the method can include generating an intermediate representation of the one or more atomic operations based on the dial action from the dial.

In some embodiments, the dial is an analog dial coupled to the exterior of the system or the dial is a separate hardware component that transmits the dial action to the system using a wireless protocol or using a wired connection. Alternatively, or in addition, the dial can be an analog user interface dial displayed by the system. Alternatively, or in addition, the queue of input actions can correspond to a series of points along an atomic digital ink stroke operation, and the dial action can modify the atomic digital ink stroke operation using the reversal operation comprising removing at least one of the points along the atomic digital ink stroke. Alternatively, or in addition, the queue of input actions can correspond to an atomic character operation, and the dial action can generate the intermediate representation of the atomic character operation using the reversal operation comprising removing at least one character. Alternatively, or in addition, the queue of input actions can correspond to an atomic character operation, and the dial action can generate the intermediate representation of the atomic character operation using the addition operation comprising adding previously removed characters to the queue of input actions. Alternatively, or in addition, the dial action can generate an intermediate representation of a previously selected input action from the queue of input actions, wherein the reversal operation changes a state of a current graphical interface tool to include at least one property from the previously selected input action. Alternatively, or in addition, the dial action comprises a counterclockwise movement indicating the reversal operation or the dial action comprises a clockwise movement indicating the addition operation. Alternatively, or in addition, the addition operation comprises repeating a last performed operation or increasing the intensity of the last performed operation. Alternatively, or in addition, the addition operation comprises copying an object from the last performed operation. Alternatively, or in addition, the reversal operation comprises modifying the effect of an image filter to maintain a reduced intensity version of the image filter. Alternatively, or in addition, the queue of input actions correspond to accessed files and the addition operation comprises copying a last accessed file.

Example 3

In yet another embodiment described herein, one or more computer-readable storage devices for modifying input can include a plurality of instructions that, based at least on execution by a processor, cause the processor to create a queue of input actions corresponding to one or more atomic operations for an application. In some examples, the input actions are provided by an input device. The plurality of instructions can also cause the processor to detect a dial action from a dial, wherein the dial action indicates a reversal operation for removing at least one input action from the queue of input actions or an addition operation for adding at least one input action to the queue of input actions, and wherein the addition operation comprises repeating a last performed operation or increasing the intensity of the last performed operation. Furthermore, the plurality of instructions can cause the processor to generate an intermediate representation of the one or more atomic operations based on the dial action from the dial.

In some embodiments, the dial is an analog dial coupled to the exterior of the system or the dial is a separate hardware component that transmits the dial action to the system using a wireless protocol or using a wired connection. Alternatively, or in addition, the dial can be an analog user interface dial displayed by the system. Alternatively, or in addition, the queue of input actions can correspond to a series of points along an atomic digital ink stroke operation, and the dial action can modify the atomic digital ink stroke operation using the reversal operation comprising removing at least one of the points along the atomic digital ink stroke. Alternatively, or in addition, the queue of input actions can correspond to an atomic character operation, and the dial action can generate the intermediate representation of the atomic character operation using the reversal operation comprising removing at least one character. Alternatively, or in addition, the queue of input actions can correspond to an atomic character operation, and the dial action can generate the intermediate representation of the atomic character operation using the addition operation comprising adding previously removed characters to the queue of input actions. Alternatively, or in addition, the dial action can generate an intermediate representation of a previously selected input action from the queue of input actions, wherein the reversal operation changes a state of a current graphical interface tool to include at least one property from the previously selected input action. Alternatively, or in addition, the dial action comprises a counterclockwise movement indicating the reversal operation or the dial action comprises a clockwise movement indicating the addition operation. Alternatively, or in addition, the addition operation comprises repeating a last performed operation or increasing the intensity of the last performed operation. Alternatively, or in addition, the addition operation comprises copying an object from the last performed operation. Alternatively, or in addition, the reversal operation comprises modifying the effect of an image filter to maintain a reduced intensity version of the image filter. Alternatively, or in addition, the queue of input actions correspond to accessed files and the addition operation comprises copying a last accessed file.

Example 4

In another embodiment, a system for modifying input can include a dial to detect a dial action, an input device to provide an input action, and a processor to detect the input action from the input device. The processor can also store the input action in a queue of input actions corresponding to one or more atomic operations for an application and detect the dial action from the dial, wherein the dial action indicates a reversal operation for removing the input action from the queue of input actions or an addition operation for adding at least one input action to the queue of input actions. Furthermore, the processor can generate a modified input action based on the dial action and the queue of input actions, and provide the modified input action to the application. In some examples, the dial is a virtual representation displayed on a display associated with the system.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system for modifying input, the system comprising:
  memory; and
  at least one processor configured to:
    create a queue of input actions corresponding to one or more atomic operations for an application;

detect a dial action from a dial, the dial action scanning the queue of input actions for a previously detected input action without removing any input actions from the queue;

generate a reference source state from an intermediate representation of the one or more atomic operations, wherein the intermediate representation of the one or more atomic operations comprises a common attribute between the one or more atomic operations, wherein the reference source state is part of a history list of virtual source states indicated by the dial; and execute, at a same time as the dial action, an additional input from a second input source that provides an action based on the intermediate representation of the one or more atomic operations.

2. The system of claim 1, wherein the dial is an analog dial coupled to an exterior of the system or the dial is a separate hardware component that transmits the dial action to the system using a wireless protocol or using a wired connection.

3. The system of claim 1, wherein the dial is an analog user interface dial displayed by the system.

4. The system of claim 1, wherein the queue of input actions corresponds to a series of points along an atomic digital ink stroke operation, and wherein the dial action modifies the atomic digital ink stroke operation using a reversal operation comprising removing at least one of the points along the atomic digital ink stroke operation.

5. The system of claim 1, wherein the queue of input actions corresponds to an atomic character operation, and wherein the dial action generates the intermediate representation of the atomic character operation using a reversal operation comprising removing at least one character.

6. The system of claim 1, wherein the queue of input actions corresponds to an atomic character operation, and wherein the dial action generates the intermediate representation of the atomic character operation using an addition operation comprising adding previously removed characters to the queue of input actions.

7. The system of claim 1, wherein the dial action generates an intermediate representation of a previously selected input action from the queue of input actions, wherein a reversal operation changes a state of a current graphical interface tool to include at least one property from the previously selected input action.

8. The system of claim 1, wherein the dial action comprises a counterclockwise movement indicating a reversal operation or the dial action comprises a clockwise movement indicating an addition operation.

9. The system of claim 8, wherein the reversal operation comprises modifying an effect of an image filter to maintain a reduced intensity version of the image filter.

10. The system of claim 8, wherein the reversal operation comprises modifying an effect of an image filter, the effect comprising increasing a hue of an image.

11. The system of claim 1, wherein a second addition operation comprises repeating a last performed operation.

12. The system of claim 1, wherein a second addition operation comprises copying an object from a last performed operation.

13. A method for modifying input, comprising:
creating a queue of input actions corresponding to one or more atomic operations for an application, the input actions provided by an input source;

detecting a dial action from a dial, the dial action scanning the queue of input actions for a previously detected input action without removing any input actions from the queue;

generating a reference source state from an intermediate representation of the one or more atomic operations, wherein the intermediate representation of the one or more atomic operations comprises a common attribute between the one or more atomic operations, wherein the reference source state is part of a history list of virtual source states indicated by the dial; and executing, at a same time as the dial action, an additional input from a second input source that provides an action based on the intermediate representation of the one or more atomic operations.

14. The method of claim 13, wherein the queue of input actions corresponds to a series of points along an atomic digital ink stroke operation, and wherein the dial action modifies the atomic digital ink stroke operation using a reversal operation comprising removing at least one of the points along the atomic digital ink stroke operation.

15. The method of claim 13, wherein the queue of input actions corresponds to an atomic character operation, and wherein the dial action generates the intermediate representation of the atomic character operation using a reversal operation comprising removing at least one character.

16. The method of claim 13, wherein the queue of input actions corresponds to an atomic character operation, and wherein the dial action generates the intermediate representation of the atomic character operation using an addition operation comprising adding previously removed characters to the queue of input actions.

17. The method of claim 13, wherein the dial action generates an intermediate representation of a previously selected input action from the queue of input actions, wherein a reversal operation changes a state of a current graphical interface tool to include at least one property from the previously selected input action.

18. The method of claim 13, wherein an addition operation comprises repeating a last performed operation or increasing an intensity of a last performed operation.

19. One or more computer-readable storage media for modifying input comprising a plurality of instructions that, based at least on execution by a processor, cause the processor to:
create a queue of input actions corresponding to one or more atomic operations for an application, the input actions provided by an input source;

detect a dial action from a dial, the dial action scanning the queue of input actions for a previously detected input action without removing any input actions from the queue;

generate a reference source state from an intermediate representation of the one or more atomic operations, wherein the intermediate representation of the one or more atomic operations comprises a common attribute between the one or more atomic operations, wherein the reference source state is part of a history list of virtual source states indicated by the dial; and execute, at a same time as the dial action, an additional input from a second input source that provides an action based on the intermediate representation of the one or more atomic operations.

20. The one or more computer-readable storage media of claim 19, wherein a reversal operation comprises modifying an effect of an image filter to maintain a reduced intensity version of the image filter.

21. A system for modifying input, comprising:
a dial to detect a dial action;
an input source to provide an input action; and
a processor to:
- detect the input action from the input source;
- store the input action in a queue of input actions corresponding to one or more atomic operations for an application;
- detect the dial action from the dial, the dial action scanning the queue of input actions for a previously detected input action without removing any input actions from the queue;
- generate a reference source state from an intermediate representation of the one or more atomic operations comprising a common attribute between the one or more atomic operations, wherein the reference source state is part of a history list of virtual source states indicated by the dial; and
- provide the reference source state to the application for executing an additional input from a second input source that provides an action at a same time as the dial action based on the intermediate representation of the one or more atomic operations.

22. The system of claim 21, wherein the dial is a virtual representation displayed on a display associated with the system.

\* \* \* \* \*